US009235551B2

(12) United States Patent
Rubie (10) Patent No.: US 9,235,551 B2
(45) Date of Patent: Jan. 12, 2016

(54) METHOD AND SYSTEM FOR SIMULATING A MILL RELINE (71) Applicant: Peter John Rubie, Toomwoomba (AU)

(72) Inventor: Peter John Rubie, Toomwoomba (AU)

(73) Assignee: Russell Mineral Equipment Pty. Ltd., Glenvale, Toowoomba (AU)

( * ) Notice: Subject to any disclaimer, the term of this patent is extended or adjusted under 35 U.S.C. 154(b) by 454 days.

(21) Appl. No.: 13/621,972

(22) Filed: Sep. 18, 2012

(65) Prior Publication Data

US 2013/0080132 A1 Mar. 28, 2013

(30) Foreign Application Priority Data

Sep. 20, 2011 (AU) ............................... 2011903845

(51) Int. Cl.
  *G06G 7/48* (2006.01)
  *G06F 17/00* (2006.01)
  *B02C 17/22* (2006.01)
  *B02C 25/00* (2006.01)
(52) U.S. Cl.
  CPC ............... *G06F 17/00* (2013.01); *B02C 17/22* (2013.01); *B02C 25/00* (2013.01)
(58) Field of Classification Search
  None
  See application file for complete search history.

(56) References Cited

U.S. PATENT DOCUMENTS

| 4,329,767 | A * | 5/1982 | Niitti ........................... 29/402.08 |
| 2003/0033041 | A1* | 2/2003 | Richey ............................. 700/98 |
| 2003/0212580 | A1* | 11/2003 | Shen ................................. 705/2 |
| 2004/0230404 | A1* | 11/2004 | Messmer et al. .................. 703/1 |
| 2005/0015294 | A1* | 1/2005 | Williams et al. ................. 705/10 |
| 2005/0203789 | A1* | 9/2005 | Kauffman et al. ................. 705/8 |
| 2006/0106637 | A1* | 5/2006 | Johnson et al. ................... 705/1 |
| 2008/0188958 | A1* | 8/2008 | Herbst ............................ 700/52 |
| 2011/0072436 | A1* | 3/2011 | Gilat et al. ..................... 718/104 |
| 2011/0251865 | A1* | 10/2011 | Yuen et al. ................... 705/7.11 |

FOREIGN PATENT DOCUMENTS

| AU | 2005239667 B2 | 11/2005 |
| WO | WO 97/26116 | 7/1997 |

OTHER PUBLICATIONS

Fidge Grinding Mill Conceptual Design Developments University of Southern Queensland Faculty of Engineering and Surveying, Oct. 28, 2010.*

* cited by examiner

*Primary Examiner* — Omar Fernandez Rivas
*Assistant Examiner* — Cuong Luu
(74) *Attorney, Agent, or Firm* — McCarter & English, LLP (57) ABSTRACT

Machine-implemented methods, systems, processing devices and machine-readable media are provided for simulating a mill reline, which involve collecting mill relining data and processing the relining data as simulation parameters using a mill relining model. The relining data generally include variables treated as discrete time/frequency distributions. Simulated events for the mill reline may be generated based on the relining data. Additional relining data relating to a specific existing site may be included as simulation parameters. The simulation may be used in determining an optimal work flow for carrying out the mill reline at a specific existing site, e.g., where time to carry out the mill reline is minimized. The simulation may also be employed for benchmarking. The additional relining data may be provided in video format, and analysis of the video format data may be undertaken, e.g., by an operator for refining and/or verifying the additional relining data, prior to utilizing the additional relining data as simulation parameters in the simulation model. The mill relining data may also include additional parameters, such as the size and quantity of the liners, the reline planning process and relining crew proficiency, the relining equipment and plant design surrounding the mill being relined, and the like.

8 Claims, 4 Drawing Sheets

METHOD AND SYSTEM FOR SIMULATING A MILL RELINE

TECHNICAL FIELD

This invention relates to a method and system for simulating a mill reline. In particular this invention is directed towards a method and system for simulating a mill reline using discrete event simulation software.

BACKGROUND

Hard rock grinding mills used in mineral processing utilize sacrificial segmented liners bolted to the internal casing of the mills which are regularly replaced during routine maintenance. Typically such mills may range in size from three meter to eleven meter diameter and are lined with replaceable heavy steel segments attached internally to the mill casing by through bolting. As the sacrificial liners wear, it becomes necessary to remove the bolts that held the sacrificial liner in place and reline the mill. In the last twenty-five years, considerable advances have been made to mechanize the mill relining process, including the use of liner bolt removal tools, an example of which is shown in WO 1997/026116 (Russell Mineral Equipment Pty Ltd) and mill relining machines an example of which is shown in Australian Patent No. 2005239667 (Russell Mineral Equipment Pty Ltd).

It has been identified that mill liner life dictates the 'when' of mineral concentrator maintenance shutdowns. Furthermore, the exchange of mill liners dictates the duration of each shutdown; the 'how long'. In combination (the 'when' and the 'how long') dictate annual maintenance shutdown lost time and therefore the availability and the possible utilisation of the mineral concentrator plant.

Since all mineral ore of value must pass through the grinding mill, liner life and liner exchange rate can define the productive limits of the entire mine site.

The duration of a mill reline is the sum of thousands of discrete and interdependent activities. The choreographing of these activities occurs in an environment that is often noisy, full of other unrelated work and where the visibility of, and communication with, dependent activities is often obscured by the mill itself. Because of the complexity of the interplay between tasks and the difficulty of quantifying them the estimation of reline times has, in most cases, been reduced to assigning an average time per piece, based on historical data, to each type of liner and multiplying this by the number of pieces to be changed.

There are four major contributors to controlling the timing of mill relining shutdowns and the speed of liner exchange, these being the liners themselves (their size and quantity); the reline planning process and relining crew proficiency; relining equipment; and plant design surrounding the grinding mills.

The state of the art for estimating reline times is based on somebody familiar with mill relining estimating the time per type of liner and multiplying by the number of liners to be changed. Most if not all methods are spreadsheet based and are incapable of predicting the effects of small changes to the process. The cost for a mill to be shut down for relining is very high, and often is of the magnitude of hundreds of thousands of dollars per hour.

To date, the methods to estimate reline times have been quite crude, and do not provide mill owners, plant and machine designers and reline planners with the ability to maximize plant efficiency.

The ability of mill owners, plant and machine designers and reline planners to estimate re-line times is usually based on their own experience. The impediments they face to maximize reline times are the large number of variables, the low frequency of relines and the economic risk associated with some changes. Also their ability to maximize the efficiency of their plants suffers from the lack of opportunity to effectively benchmark current performance against best practice.

The present invention seeks to provide a method and system for simulating a mill reline that can ameliorate at least some of the disadvantages of the prior art.

SUMMARY OF INVENTION

According to a first aspect the present invention consists in a machine-implemented method for simulating a mill reline comprising:

collecting milling mill relining data from a plurality of mine sites and storing same in a database stored in at least one computer;

passing the relining data as simulation parameters to a mill relining model stored in the at least one computer or another computer connected thereto, in which at least some of said relining data are variables are treated as discrete time/frequency distributions; and simulating events for said mill reline based on said relining data.

Preferably additional relining data relating to a specific existing site is passed as simulation parameters to said mill relining model, and the simulation is for determining an optimal work flow for carrying out the mill reline at said specific existing site, where time to carry out said mill reline is minimized.

Preferably additional relining data relating to a specific existing site is passed as simulation parameters to said mill relining model, and the simulation is for benchmarking.

Preferably said at least some of said additional relining data is data initially provided in video format, and analysis of same is required by an operator for refining and/or verifying said additional relining data prior to same being passed as simulation parameters to said simulation model.

Preferably additional relining data relating to a proposed new site and/or mill design is passed as simulation parameters to said mill relining model, and the simulation is for determining an optimal work flow for carrying out the mill reline for said proposed new site and/or mill design.

Preferably mill relining data comprises the size and quantity of the liners, the reline planning process and relining crew proficiency, the relining equipment and plant design surrounding the mill being relined.

According to a second aspect the present invention consists in a processing device comprising:

at least one processor;

a memory including instructions for the processor: and a bus for providing communication between the processor and the memory, the memory further comprising instructions for receiving mill relining data from a plurality of mine sites in which at least some of said relining data are variables treated as discrete time/frequency distributions, and simulating events in at least one mill reline based on said mill relining data.

According to a third aspect the present invention consists in a tangible, machine-readable medium having instructions for at least one processor recorded thereon, the medium comprising: instructions for receiving mill relining data from a plurality of mine sites, in which at least some of said relining data are variables treated as discrete time/frequency distributions;

and instructions for simulating events in at least one mill reline based on said received reline data.

According to a fourth aspect the present invention consists in a system for simulating a mill reline on a web-based network, said system comprising:

(i) at least one computer operated on behalf of a simulation administrator for the purpose of maintaining a web-based mill reline simulation model using associated discrete event simulation software and a database for storing mill relining data in the form of variables treated as discrete time/frequency distributions, said web-based network comprising a website;

(ii) at least a second computer used by a first user to access said mill reline simulation model via an online account, and said website having a user web page associated with said first user;

wherein said user page is provided with a link to said database so that said user can add additional mill reline data to said database, and a link to said discrete event simulation software so that instructions may be provided to simulate at least one mill reline.

Preferably said additional relining data is data relating to a specific existing site, and the simulation is for determining an optimal work flow for carrying out the mill reline at said specific existing site, where time to carry out said mill reline is minimized.

Preferably said additional relining data is data relating to a specific existing site, and the simulation is for benchmarking.

Preferably said at least some of said additional relining data is data initially provided in video format, and analysis of same is required by an operator for refining and/or verifying said additional relining data prior to same being passed as simulation parameters to said simulation model.

Preferably said additional relining data relates to a proposed new site and/or mill design, and the simulation is for determining an optimal work flow for carrying out the mill reline for said proposed new site and/or mill design.

DESCRIPTION OF PREFERRED EMBODIMENTS

Figure 1:
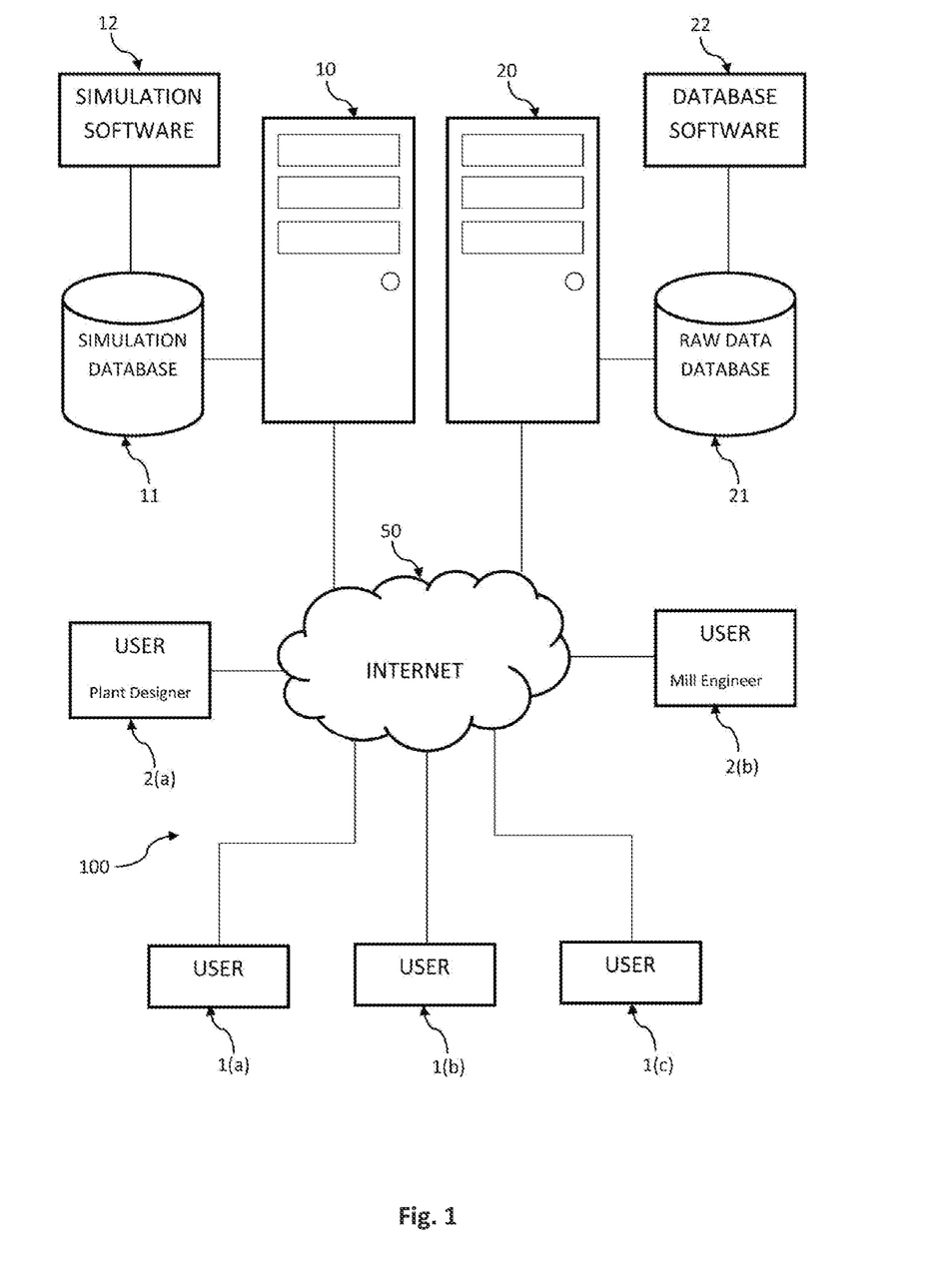
FIG. 1 is a diagrammatic view of a system for simulating a mill reline conducted over web-based network.

FIG. 1 depicts a first embodiment of a system 100, which allows for users on a web-based network over the Internet 50 to simulate a mill reline.

The simulation is for determining an "optimal work flow" for carrying out the mill reline. The term "optimal work flow" includes within its meaning the optimisation of tool configurations used for the mill reline, and optimisation of the mill parameters.

A plurality of users, five of which are shown in FIG. 1 as users (with computer access) 1(a)-1(c) and 2(a)-2(b) are members of a web-based "simulation" network, administered by a website owner or alternatively a website administrator (not shown) on behalf of the owner, via at least a first computer 10.

Users 1(a)-1(c) may be maintenance managers/engineers at mine sites, whilst user 2(a) may be a plant designer, and user 2(b) may be a mill manufacturing designer/engineer.

A simulation database 11 associated with simulation software (application) 12 reside on first computer 10 administered by the earlier mentioned administrator.

The users are able to access application 12, via a website. A website page screen selection (not shown) allows users 1(a)-1(c) to register and then use the web-based simulation network by selecting various menus. Each user 1(a)-1(c), 2(a)-2(b) in a conventional way is able to register their details with the system.

A "mill reline raw data" database 21 with associated database software 22 resides on another computer 20 and is also administered by the earlier mentioned administrator. Database 21 contains a relational database of mill reline data, relating to particular mine sites. This data may for a particular mine site, include video captured recordings of actual relines, inventory of equipment and details of available personnel to carry out the reline.

"Raw data" provided to database 21 can be analysed and if suitable verified by the administrator for use as comparative/benchmarking purposes. "Verified data" can then be copied or transferred by the administrator from database 21 to database 11 associated with simulation software 12.

Where "raw data" is provided by a user 1(a)-(c) in video captured recordings to database 21, it may require analysis by the administrator (or authorised operator) to refine and verify data prior to it being suitable for use in software 12.

In use, a maintenance manager such as user 1(a) may for example video record an actual "mill reline" as it is performed. The resultant video recording (not shown) along with other data may be provided by user 1(a) over the Internet 50 to database 21. The video recording may be analysed and refined for simulation purposes prior to being provided as "refined and verified data" to simulation database 11.

This "refined and verified data" may then be used for simulation purposes.

Whilst maintenance managers (users 1(a)-1(c)) may wish to run a simulation for benchmarking and/or optimization for existing mine sites, user (plant designer) 2(a) or user (mill manufacturer) 2(b) may wish to input proposed liner arrangement data and resources to simulate future reline scenarios for proposed new site and/or mill designs.

Figure 2:
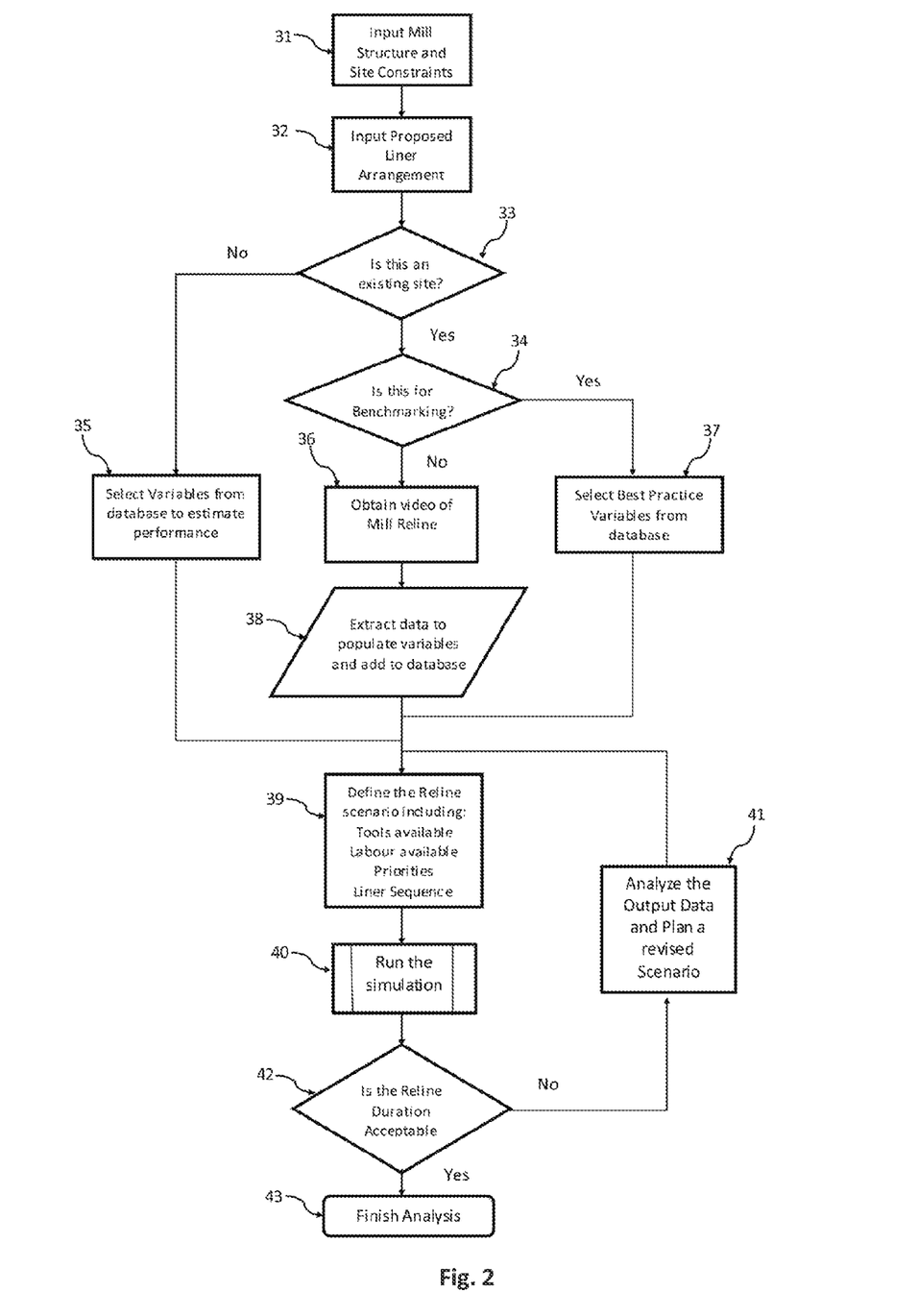
FIG. 2 is flow diagram of the steps to simulate a mill reline using the system shown in FIG. 1.

FIG. 2 depicts an example flow diagram of steps to simulate a mill reline as follows.

With reference to FIG. 2, user (maintenance manager) 1(a), may for instance:

input mill structure and site constraints as indicated at block 31 input proposed liner arrangement as indicated at block 32 input YES for "is this an existing site?" as indicated at decision block 33 input YES for "is this for benchmarking?" as indicated at decision block 34 select best practice variables from database 11 as indicated at block 37

Define reline scenario, includes tool inventory available, labour available, priorities and liner sequence as indicated at block 39

Run the simulation as indicated at predefined process block 40

If reline Duration is not acceptable, input NO at decision block 42

Analyze the output data and plan a revised scenario at 41 before returning to block 39

If reline Duration is acceptable, input YES at decision block 42

Finish analysis at block 43.

Where a maintenance manager 1(*a*) is instead not doing it for benchmarking, then at block 34 he would answer NO, and instead have to provide a video of an "actual mill reline" as indicated at block 36. The earlier mentioned administrator (or personnel acting on behalf of the administrator) could then analyse the video and extract the data necessary to input at block 38. The maintenance manager 1(*a*) could then run through the steps shown at blocks 39-43 of FIG. 2.

Where a plant designer 2(*a*) or mill manufacturing engineer 2(*b*) were wishing to simulate a proposed mill reline, they would take the following steps.

input "proposed" mill structure and site constraints as indicated at block 31 input proposed liner arrangement as indicated at block 32

Select variables from database 11 to estimate performance as indicated at decision block 35

Define proposed reline scenario, includes tool inventory available, labour available, priorities and liner sequence as indicated at block 39

Run the simulation as indicated at predefined process block 40

If reline Duration is not acceptable, input NO at decision block 42

Analyze the output data and plan a revised proposed scenario at 41 before returning to block 39

If reline Duration is acceptable, input YES at decision block 42

Finish analysis at block 43.

In the abovementioned embodiment, databases 11 and 21 are shown as separate databases, but they could in another embodiment be a single database of data.

In the abovementioned embodiment, user 1(*a*) may record a video of an actual mill reline to capture data. However it should be understood that instead of recording a video of an actual mill reline, user 1(*a*) could have a "time and motion study" conducted on an actual mill reline to collect similar data. This "time and motion study" could be conducted by a consultant or contractor, preferably associated with or certified by the abovementioned administrator.

An explanation of how simulation software (application) 12 has been developed and used in system 100 is as follows.

There are four major contributors to controlling the timing of mill relining shutdowns and the speed of liner exchange, these being:

the liners themselves (their size and quantity);
the reline planning process and relining crew proficiency;
relining equipment; and
plant design surrounding the grinding mills.

Simulation software 12 includes "discrete event software" is used to model complex process flow where the interplay of operations or part/labour flows cannot be predicted using analytic methods and where the only other alternative to modelling is trying out the changes on a live system.

In order to provide a simulation of a mill reline model, we started with four separate mining sites which use RUSSELL 8™ or RUSSELL TWIN 8™ mill mining machines. These four mining sites were initially studied to collate identifying major variables related to equipment used. These major variables are shown in Table 1.

TABLE 1

Major Variables

| Variable | Tool | Parameters affecting variable |
|---|---|---|
| Fastener Removal | | |
| Nut Resistance | Rattle gun | Rattle gun relative effectiveness × standardised nut resistance distribution |
| High torque tool | High torque tool | Unique to tool - independent of nut resistance |
| Oxy acetylene Torch | Oxy acetylene torch | Bolt diameter/operator skill - independent of nut resistance |
| Washer removal | Pry bar/specialised tool | Unique to tool/washer combination |
| Bolt resistance | THUNDERBOLT ™ Hammer | Hammer relative effectiveness × standardised bolt resistance |
| Time between bolts | THUNDERBOLT ™ Hammer | A function of suspension method and operator skill |
| Time lost on bolts | THUNDERBOLT ™ Hammer | A function of guidance method |
| Lost time due to platform movement | Platform - manual or powered | A function of platform type |
| Liner Removal | | |
| Liner resistance | THUNDERBOLT ™ Hammer | THUNDERBOLT relative effectiveness × liner resistance × liner mass scaling factor |
| Stuck liner time | Mill Relining Machine | Applies to liners not removed using THUNDERBOLT hammers and is unique to each liner |
| Liner turning | Mill Relining Machine | Applies to any liner needing machine intervention prior to slinging - a user specified ratio |
| Slinging time | Sling/O-ZONE ™ Tool | Varies with tool |
| Machine travel time | Mill Relining Machine | Varies with liner position in Mill |
| Liner Cart loading | Sling/O-ZONE ™ Tool | Varies with suspension method and operator skill |
| Liner Release | Sling/O-ZONE ™ Tool | Varies with suspension method and operator skill |
| Liner Cart Turning | Liner Cart | A function of liner mass |
| Liner Placement | | |
| Liner pick up | Grapple Tool | Operator skill and tool type |
| Liner positioning | Mill Relining Machine | Operator skill |

TABLE 1-continued

Major Variables

| Variable | Tool | Parameters affecting variable |
|---|---|---|
| Liner Securing and release | Grapple Tool | Tool type |
| Fork Lift Loading and Unloading | Fork Lift | Operator skill |

In order to be effective as a simulation model it should be able to easily change and analyse the effects on reline time of something as small as:

the speed of the liner cart;

the size of, or distance to, the liner lay down area;

the size, type, priority or number of any tool in any particular work zone;

whether the liner cart is loaded from the rear or the side.

Furthermore, analysis of significant elements are as follows:

using a Single or Twin Mill Relining Machine;

changing the number of liners in the mill; or, installing an elevating platform;

the number of personnel on dayshift or nightshift.

All variables are treated as discrete time/frequency distributions; five discrete intervals are used for each variable. The time measurement of the operations associated with each variable are grouped or averaged together into five logical time intervals and a count of the number of occurrences at that time entered in the frequency column.

The use of distributions rather than overall average times is essential to the accuracy of simulation software. For example if the time taken for a mill relining machine to retrieve a worn liner is represented by the distribution in Table 2 (shown below) and the time taken for the liner cart to return to pick up the liner is represented in Table 3 (shown below), if overall average times (75 sec for the machine and 74 sec for the liner cart) were used, it appears that the machine never waits for the liner cart. However it is obvious from the tables that (using this fictitious data) the machine may wait at times up to 250−30=220 seconds for the liner cart. The total time the machine waits depends on the order in which the variables are combined. A random number stream is used to select the time assigned to an event based on its relative frequency in the appropriate variable. This type of relationship is repeated throughout the reline thousands of times and illustrates why a simulation such as this is necessary to provide sensible real world results. It should be noted that the distributions in Tables 2 and 3 are for illustration purposes only. In the actual simulation each of these actual activities is the result of the combination of many variables.

TABLE 2

Liner Retrieval Distribution

| Time (Seconds) | Relative Frequency |
|---|---|
| 30 | 5 |
| 45 | 15 |
| 60 | 30 |
| 120 | 10 |
| 300 | 3 |
| Average time | 75 Sec |

TABLE 3

Liner Cart Return Distribution

| Time (Seconds) | Relative Frequency |
|---|---|
| 20 | 2 |
| 30 | 6 |
| 50 | 25 |
| 100 | 10 |
| 250 | 4 |
| Average Time | 74 Sec |

The data populating each variable is determined from video recordings of actual relines at each of the separate mining sites, Whilst even based on a small set of data of say only four mine sites, the method of simulating a mill reline is possible, a larger data set is required for simulations to be statistically accurate.

The relative effectiveness of various tools, for example the time difference between a THUNDERBOLT™ 1500 and a THUNDERBOLT™ 750 Hammer removing the same liner bolt, needed to be considered. To allow one variable to be used by different sized hammers a theoretical relative effectiveness index was calculated. This will be validated in the future via experiment. Similar experiments will be required for comparing rattle guns and suspension methods.

Figure 3:
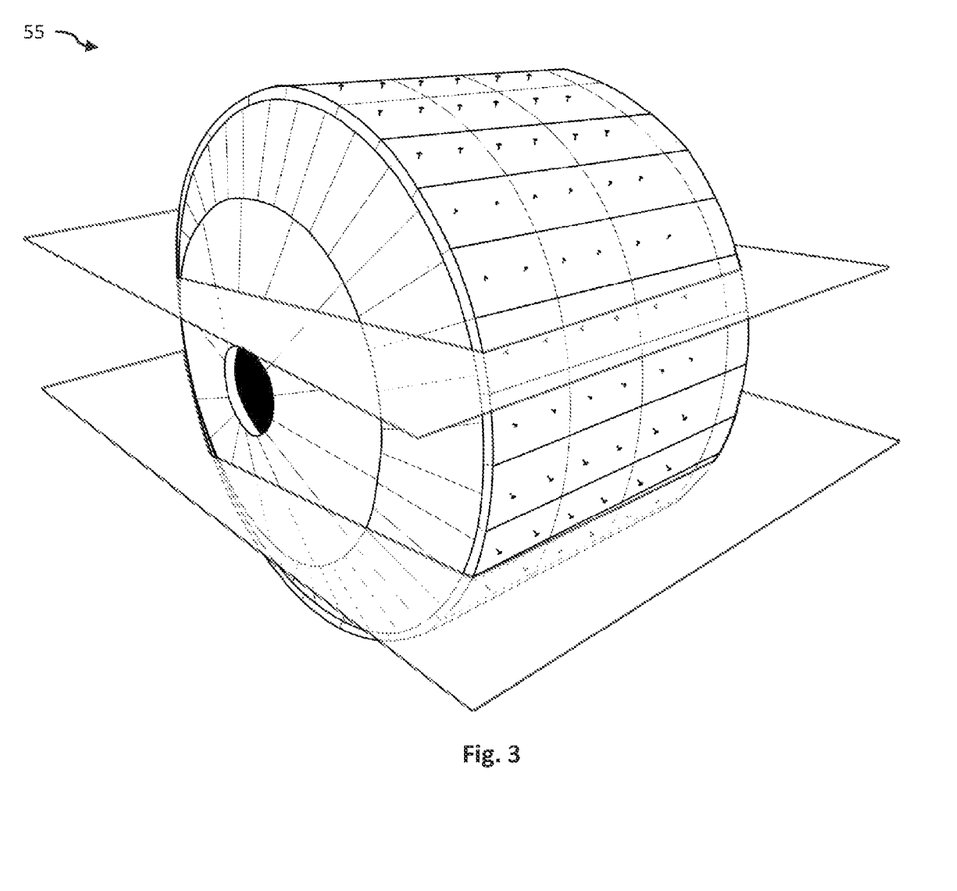
FIG. 3. is a schematic of a 3D mill set up model using the simulation software of the system shown in FIG. 1.
Figure 4:
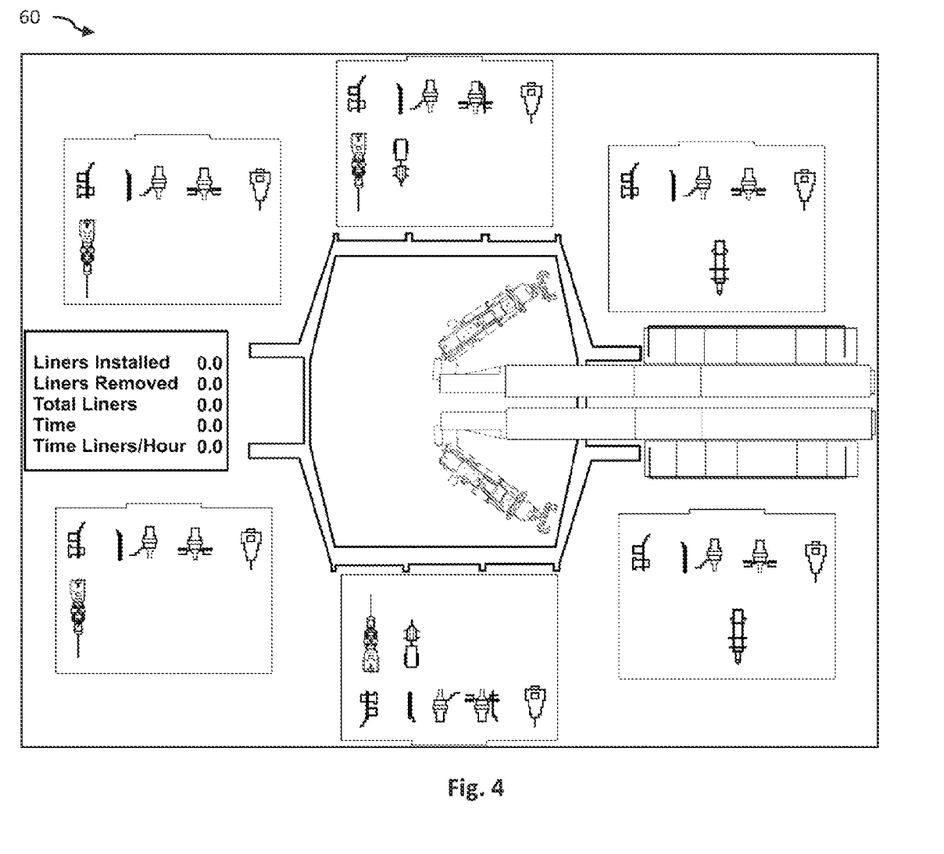
FIG. 4. is a schematic of the mill reline simulation screen using the simulation software of the system shown in FIG. 1.

The modelling process begins by specifying the geometry of the mill and its surroundings and defining the shape and location of each liner and fastener. A 3D model is generated progressively as data is entered; this provides visual validation of the progress and accuracy of construction. The area around the mill is divided into six independent work zones two each on the feed end, discharge end and shell. The floor levels in each zone are entered and also the height that is accessible at each zone. The charge level and access height inside the mill are also specified. These inputs result in transparent surfaces at the heights specified and are provided as visual prompts to the operator when planning a reline scenario. FIG. 3 shows a fully populated 3D model of the outside of a mill 55, whilst FIG. 4 shows an "animation screen" (or web page) 60 for the simulation in which the "six work zones" surrounding the mill are schematically depicted.

The variables appropriate to each liner and fastener are then assigned. The user selects these from the data set that is most appropriate to the liner/fastener element being defined. If the simulation relates to an existing mill these variables can be sourced from data gathered during previous relines. If it is a new mill the data selected can be sourced from the nearest geometric and operational match. It is anticipated that over time database 11 will become comprehensive, covering a wide range of mills and operating parameters, including a greater variety of tools used in mill relining. In the future a data set will evolve in database 11 that captures the current best practice time and frequency distributions may be constructed to allow mill owners to "benchmark" the relative performance of their relines.

Once the mill is constructed and populated with liners and fasteners any number of reline scenarios can be defined, run and analysed as discussed below.

Using the same 3D model constructed during mill setup, the operator is able to rotate the mill to its starting angle and select liners for removal in this position. Any fasteners associated with the liner are automatically selected at the same time. As liners to be removed are selected, they are identified by a change in colour. The transparent surfaces representing the floor and reach height provide a guide as to which liners are accessible. This data is captured via a check box and then the liners that are to be replaced before inching are selected in the same way. The mill is then rotated to the next position and the liners for removal and replacement are selected. This process is repeated until the full reline is specified.

Bolt Removal and Liner Knock in Phase

Each of the six external work zones is programmed to operate independently and can be configured with any tool combination.

Tools that can be specified in each zone include any combination or quantity of:
THUNDERBOLT™ Hammers or sledge hammers;
rattle guns (range of sizes);
high torque tools (torque multipliers);
washer removal tools;
T-MAG™ hammer moil guides;
elevating platforms;
manual platforms;
jib or monorail tool suspension;
Oxy acetylene torches (this equipment is shared between zones).

The number of reline personnel available is entered and can be varied from day to night shift. Tools are only active if sufficient labour is available, so labour control is important. The operator can assign priorities to the feed, shell and discharge work zones and specify the preferred number of operators for each stage of nut, washer, bolt and liner removal. Labour is then allocated according to zone priority and stage. Each operation commences after the preceding operation is complete or after a user specified number of nuts or washers is removed. If T-MAG™ hammer moil guides are used washers need not be removed. If high torque tools are specified these will be used to remove nuts that the rattle gun cannot. If high torque tools are not specified seized nuts are removed using the oxy acetylene torch.

Liner knock in will be carried out by the largest hammer specified for the zone where possible.

Liner Removal/Replacement

Liner removal commences once liner knock in is complete. RUSSELL™ Single or Twin mill relining machines can be specified for the scenario along with the variables that define their behaviour.

There is a great deal of flexibility around the set up of the storage yard, liner lay down area, number and method of operation of forklifts and travelling distances. The method of operation of the liner cart/s can also be easily configured.

Set up times are allocated for the relining machine between the various reline phases. The number of personnel working on the mill charge is specified. They commence by placing slings on accessible liners using O-ZONE™ liner lifting tools or chains and hooks if O-ZONE™ tools are not specified. Walk time between liners and tool specific slinging times dictate how long this task takes. The relining machine operator randomly selects liners and the program uses different variables depending on whether the liner must be dislodged from the mill, turned on the charge or can be removed immediately.

The next phase of the reline, liner placement, commences once all liners specified for the current mill position are removed. Because the RUSSELL TWIN™ machines are completely independent, there is an option in the program to allow either of the twin machines to commence placing liners before the other machine has completed removal. Liner placement is largely dictated by the type of liner being placed and the placement variables specified during mill set up.

Running the Scenario

The program, as it executes the scenario, creates an animation of the reline. This is a very useful tool as it provides visual verification that everything is interacting as expected. The speed of the animation can be varied however it does significantly slow the program down. Once satisfied that the scenario is running correctly, the animation can be turned off allowing fast computation. As the reline runs data relating to the timing of every function is collated and stored in the program. Various reports are generated that reveal the performance of the reline. Bottlenecks and areas that require focus are also highlighted.

The Importance of Labor

As previously indicated, the assignment and control of labor is critical in replicating the real world situation and predicting the duration of relines. The software 12 is written so that an analyst (user) can prioritize zones and assign desired team sizes to each zone for each phase of fastener and liner removal. The total number of personnel available for both night and day shifts and the maximum number in any one zone are specified for each simulation. As the software (application) 12 runs it assigns labor to the high priority zones to satisfy the demand and the desired team size for the task being undertaken. If there is insufficient labor to satisfy the requirements of all zones those with a lower priority must wait until labor becomes free.

The software (application) 12 is written to reflect the four major phases of a reline:
Knock in
    Nut removal
    Washer removal
    Bolt removal
    Liner knock in
Liner Removal
Liner Installation
Mill Inching The terms "comprising" and "including" (and their grammatical variations) as used herein are used in inclusive sense and not in the exclusive sense of "consisting only of".

The invention claimed is:
1. A machine-implemented method for simulating a mill reline comprising:
collecting mill relining data from a plurality of mine sites and storing same in a database stored in at least one computer;
passing the relining data as simulation parameters to a mill relining model stored in the a least one computer or another computer connected thereto, in which at least some of said relining data are variables and are treated as discrete time/frequency distributions; and simulating events for said rail reline based on said relining data, said relining data relating to specific existing site is passed as simulation parameters to said mill relining model, and the simulation is for determining an optimal work flow for carrying out the mill reline at said specific site, wherein at least some of said relining data is data initially provided in video captured recording of actual relines, and analysis of said video is required by an operator for relining or verifying said relining data prior to the relining data being passed as simulation parameters to said simulation model.

2. A machine-implemented method as claimed in claim 1, wherein relining data relating to a specific existing site is passed as simulation parameters to said mill relining model, and the simulation is for benchmarking.

3. A machine-implemented method as claimed in claim 1, wherein relining data relating to a proposed new site or mill design is passed as simulation parameters to said mill relining model, and the simulation is for determining an optimal work flow for carrying out the mill reline for said proposed new site or mill design.

4. A machine-implemented method as claimed in claim 1, wherein the mill relining data comprises the size and quantity of the liners, the reline planning process and relining crew proficiency, the relining equipment and plant design surrounding the mill being relined.

5. A system for simulating a mill reline on a web-based network, said system comprising:
 (i) a least one computer operated on behalf of a simulation administrator for the purpose of maintaining a web-based mill reline simulation model using associated discrete event simulation software and a database for storing mill relining data in the form of variables treated as discrete time/frequency distributions, said web-based network comprising a website;
 (ii) at least a second computer used by a first user to access said mill reline simulation model via an online account, and said website having a user web page associated with said first user; wherein said user page is provided with a link to said database so that said user can add additional mill reline data to said database, and a link to said discrete event simulation software so that instructions may be provided to simulate at least one mill reline;
 wherein said additional mill relining data is data relating to a specific existing site, and the simulation is for determining an optimal flow for carrying out the mill reline at said specific site; and
 wherein at least some of said additional mill relining data is data initially provided in video captured recoding of actual relines, and analysis of the video is required by an operator for relining and/or verifying said additional mill relining data prior to the video being passed as simulation parameters to said simulation model.

6. A system as claimed in claim 5, wherein said additional relining data is data relating to a specific existing site, and the simulation is for benchmarking.

7. A system as claimed in claim 5, wherein said additional relining data relates to a proposed new site or mill design, and the simulation is for determining an optimal work flow for carrying out the mill reline for said proposed new site or mill design.

8. A system as claimed in claim 5, wherein the mill relining data comprises the size and quantity of the liners, the reline planning process and relining crew proficiency, the relining equipment and plant design surrounding the mill being relined.

* * * * *